United States Patent
Lovegrove et al.

(10) Patent No.: US 8,329,108 B2
(45) Date of Patent: Dec. 11, 2012

(54) ISOOLEFIN-DIOLEFIN PRODUCTION PROCESS AND APPARATUS THEREFORE

(75) Inventors: John Lovegrove, Sarnia (CA);
Hans-Juergen Mick, Duisburg (DE)

(73) Assignee: Lanxess Inc., Sarnia (CA)

( * ) Notice: Subject to any disclaimer, the term of this patent is extended or adjusted under 35 U.S.C. 154(b) by 0 days.

(21) Appl. No.: 12/970,057

(22) Filed: Dec. 16, 2010

(65) Prior Publication Data

US 2011/0150712 A1    Jun. 23, 2011

Related U.S. Application Data

(63) Continuation of application No. 11/058,875, filed on Feb. 16, 2005, now Pat. No. 7,931,873.

(30) Foreign Application Priority Data

Feb. 23, 2004  (CA) ...................................... 2458750

(51) Int. Cl.
*B01J 19/20* (2006.01)
*B01J 19/00* (2006.01)

(52) U.S. Cl. ........................................ 422/137; 422/138
(58) Field of Classification Search .................. 422/137, 422/138
See application file for complete search history.

(56) References Cited

U.S. PATENT DOCUMENTS 4,714,747 A * 12/1987 Bruzzone et al. ............... 526/64

FOREIGN PATENT DOCUMENTS

| EP | 0659767 | 2/1996 |
|---|---|---|
| GB | 561324 | 5/1944 |
| GB | 589045 | 6/1947 |
| WO | 93/21241 | 10/1993 |

OTHER PUBLICATIONS

Hagberg, Carl; "Extruder Isolation of Polymers and Elastomers from Latex Emulsions", Paper presented at the International Latex Conference, Akron, OH; Jul. 22, 1998.
European Search Report from co-pending Application EP05003492 dated Jul. 12, 2005, 2 pages.

* cited by examiner

*Primary Examiner* — William Cheung
(74) *Attorney, Agent, or Firm* — Michael A. Miller

(57) ABSTRACT

In an isoolefin-diolefin rubber production process (e.g. a butyl rubber production process), the cold rubber slurry produced in the reaction vessel is transported from the reaction vessel to the flash tank during which time the cold slurry may be expressed to separate at least part of the cold liquid reaction medium from the isoolefin-diolefin rubber. The separated cold liquid reaction medium is transported off stream, for example by a mechanical filter, where it can be recycled back into the reaction vessel and/or where it can be used to cool a feed stream or streams of the reaction components. The isoolefin-diolefin rubber and the residual liquid reaction medium are transported to a flash tank for further processing. The ability to separate and recycle cold liquid reaction medium makes the process more economical. In one aspect, the slurry may be transported from the reaction vessel to the flash tank by a self-cleaning fully intermeshing co-rotating twin screw extruder, which helps overcome the problem of plugging due to rubber sticking to the surfaces of the slurry transfer apparatus.

10 Claims, 7 Drawing Sheets

ISOOLEFIN-DIOLEFIN PRODUCTION PROCESS AND APPARATUS THEREFORE

CROSS REFERENCE

This application is a continuation of U.S. patent application Ser. No. 11/058,875 filed Feb. 16, 2005, now U.S. Pat. No. 7,931,873, and this application is related to U.S. patent application Ser. No. 12/606,561, filed Oct. 27, 2009, now U.S. Pat. No. 7,960,491, which is a divisional of U.S. patent application Ser. No. 11/058,875 filed Feb. 16, 2005, now U.S. Pat. No. 7,931,873, entitled "ISOOLEFIN-DIOLEFIN PRODUCTION PROCESS AND APPARATUS THEREFORE", the contents of which are hereby incorporated by reference in their entirety.

FIELD OF THE INVENTION

This present invention relates to isoolefin-diolefin rubber processes and apparatuses therefor. Further, the present invention relates to processes and apparatuses for producing an isoolefin-diolefin rubber, to processes and apparatuses for separating isoolefin-diolefin rubber from rubber slurry, and to processes and apparatuses for discharging and/or transferring rubber slurry from an isoolefin-diolefin rubber reactor.

BACKGROUND OF THE INVENTION

Isoolefin-diolefin rubbers, for example, butyl rubber and the halobutyl rubbers derived from butyl rubber (e.g. chlorobutyl rubber and bromobutyl rubber), are used extensively in a number of applications, for example in tire manufacture. Commercially, isoolefin-diolefin rubber is typically prepared by suspension copolymerization of an isoolefin (e.g. isobutylene) with a diolefin (e.g. isoprene) in the presence of a catalyst (e.g. a Friedal-Crafts type catalyst) in a liquid non-aqueous reaction medium (e.g. comprising a diluent such as an alkyl halide) at a temperature below $-90°$ C. in a continuous reactor to form a suspension or slurry of fine rubber "solids" in the reaction medium. The reaction temperature may be higher with the use of specialized catalysts.

A commercial apparatus comprises, among other elements, a reaction vessel in which the reaction is continuously conducted, a flash tank for evaporating liquid reaction medium and other volatile components away from the rubber which was formed in the reaction, and a discharge line for transferring rubber slurry from the reaction vessel to the flash tank. A flash tank is normally a vessel containing heated, agitated water into which the rubber is discharged, forming a crumb that is suspended in water. Steam is sparged into the flash tank to maintain the temperature and drive off volatile residual reaction medium. In conventional processes, the flash tank is normally followed by one or more stripping vessels to further remove residuals down to an acceptable level. Reaction components are normally charged to the reaction vessel in two separate feeds, a mixed feed containing monomers together with a diluent and a catalyst feed containing catalyst.

One problem encountered with such a process is the accumulation of rubber on the inner surfaces of the reaction vessel and discharge line, which can lead to fouling and considerable down time to correct the fouling. Such accumulation is a result of the "stickiness" of the isoolefin-diolefin rubbers such as butyl rubber. In order to reduce this problem, relatively high flow velocities are maintained in the reaction vessel and the discharge line. The discharge line is also steam jacketed and this is believed to lead to the formation of a vapor layer on the inside surface of the discharge line that acts like a lubricating film.

In addition, it is desirable to increase the overall energy efficiency of current commercial apparatuses. Currently, cold rubber slurry exiting the reaction vessel is transferred directly to a flash tank by the discharge line. In the flash tank, the liquid reaction medium including volatile components such as unreacted monomers, etc. is vaporized. In order to recycle the vaporized components, part of the process involves condensing those vapors and cooling the liquid back to the reaction temperature. This requires significant expenditure of energy. To reduce the amount of energy expended in cooling virgin and/or recycled reaction components, it would be desirable to capture the energy associated with the cold liquid reaction medium discharged from the reaction vessel.

WO 93/21241 to Bruzzone et al. published Oct. 28, 1993 describes a process for butyl rubber production. Polymerization of isobutylene with isoprene is conducted at a relatively high temperature of $-50°$ C. in the presence of special catalysts. The reactor comprises a vertical cylindrical domed reaction vessel, a vertical single screw extruder (i.e. a discharge screw) associated with the reaction vessel and a horizontal double screw volatilizer connected to the discharge screw. The vertical extruder conveys and presses the solid polymer contained in the slurry upward and "squeezes" the liquid out of the slurry allowing it to drain downward (i.e. backward) toward the reaction vessel. In this way, valuable reaction medium including unreacted monomers at the reaction temperature is returned to the reaction vessel for further utilization. Residual reaction medium including residual monomers is volatilized in the horizontal screw volatilizer and fed as a gas to a heat exchanger for cooling down to polymerization temperature before re-entering the reaction vessel as a liquid.

While the process of WO 93/21241 permits recycling of some of the reaction medium by forcing it back into the reaction vessel, it suffers from several drawbacks. Firstly, the discharge screw is a single screw extruder, which is prone to fouling and is therefore unlikely to continue to operate for a worthwhile length of time. Secondly, the liquid reaction medium is forced back into the reaction vessel by the action of gravity without first being taken off stream, thereby not providing the opportunity to purify the liquid reaction medium, or the opportunity to use cold reaction medium for other cooling purposes if direct return of the reaction medium to the reaction vessel affects the polymerization process. Having no opportunity to purify the liquid reaction medium may result in a critical build-up of impurities, which would likely result in reduced catalyst efficiency and/or low molecular weight polymer being produced. The latter may cause fouling and consequently down time for cleaning the reactor. The inability to utilize the cold liquid reaction medium for other cooling purposes reduces flexibility of choice of energy recovery process. Thirdly, the use of a screw devolatilizer to volatilize residual reaction medium and monomers is not cost effective in comparison to the use of a flash tank.

GB 589,045 (the '045 patent) to Standard Oil Development Company issued on Jun. 10, 1947 describes a process for the low temperature polymerization of olefins. The '045 patent indicates that cold slurry from a reaction vessel is transported to a vibrating screen to undergo a straining or filtering operation. It further indicates that the recovered cold liquid is then recycled back into the reaction zone. Residual reaction medium and the rubber formed in the reaction are transported from the vibrating screen to a flash drum where unreacted monomers and residual reaction medium are vaporized.

In order to prevent steam from the flash tank from entering the vibrating screen and thereby contaminating the reaction medium, the '045 patent teaches a complicated system whereby a stream of sealing gas provides a positive pressure from the vibrating screen into the flash tank. Such a system is impractical because the sealing gas will mix with overhead vapors from the flash tank. The subsequent separation step would add significant cost to the process. Furthermore, the '045 patent teaches that the vibrating screen must be cooled to the reaction temperature, which would be very difficult to achieve in practice. Furthermore, it has been the experience in the butyl rubber art that the butyl rubber "solid" produced in the chemical reaction is in a fine and relatively soft particulate form that is prone to agglomeration. Furthermore, it has been the experience in the butyl rubber art that butyl rubber is "sticky" even at reaction temperatures, in contrast to statements made in the '045 patent. Therefore, one skilled in the art would expect there to be a major problem with fouling of the vibrating screen. Thus, a vibrating screen would not be expected to satisfactorily separate butyl rubber from the reaction medium. Indeed, the screening or filtering apparatus and process described in the '045 patent are not in use in any form today in the butyl rubber industry, almost 60 years after the filing of the '045 patent, an indication of the impracticality and general lack of usefulness of the technology described in the '045 patent. Finally, the '045 patent teaches that the cold rubber slurry produced in the reaction vessel contains from 1 to 10% by weight of rubber. Currently, butyl rubber reactors are typically operated to produce rubber slurries having rubber content in the region of about 25% by weight. The aforementioned problems with using a vibrating screen, particularly the fouling problem, would be exacerbated in apparatuses where the reactor produces rubber slurries having a rubber content of greater than 10% by weight.

is U.S. Pat. No. 4,714,747 (the '747 patent) to Bruzzone issued on Dec. 22, 1987 describes a process for the manufacture of butyl rubber. The butyl rubber reaction itself is conducted in a self-cleaning twin screw extruder. The rubber slurry produced in the reaction extruder is transported to a vertical discharge screw which forces liquid reaction medium out of the slurry and allows it to drain back into the reaction extruder while permitting gaseous monomer-solvent mixture to vent out through a vapor outlet line at the top of the discharge screw. The rubber phase enters a heated twin screw desolventizer at the bottom of the discharge screw.

The process and apparatus described in the '747 patent has several drawbacks. Firstly, the process relies on evaporative cooling of the reaction medium to remove the heat of polymerization. It is therefore only applicable to higher temperature (i.e. −20 to +150° C.) polymerization of butyl rubber, which will only work if suitable high temperature catalysts are available. Conventional reaction temperatures are far too low for evaporative cooling to work with normal reaction media and conventional catalysts will not produce acceptable molecular weight polymer at higher temperatures. Secondly, the liquid reaction medium flows back into the reaction extruder by the action of gravity without first being taken off stream, thereby not providing the opportunity to purify the liquid reaction medium. Having no opportunity to purify the liquid reaction medium may result in a critical build-up of impurities, which would likely result in reduced catalyst efficiency and/or low molecular weight polymer being produced. Thirdly, the use of the discharge screw and a screw devolatilizer to volatilize residual reaction medium and monomers is inefficient in comparison to the use of a flash tank. Fourthly, the reaction is conducted in a twin screw extruder rather than a typical butyl rubber reaction vessel. The volume capacity of such a reaction extruder must be large in order to efficiently accommodate the reaction components. A screw extruder of such size is capital intensive thereby raising the cost of the apparatus considerably.

In the paper entitled "Extruder Isolation of Polymers and Elastomers from is Latex Emulsions", by Carl Hagberg presented at the International Latex Conference on Jul. 22, 1998, there is described a room temperature system for isolating solid polymers from latex emulsions. The system employs a counter-rotating, non-intermeshing twin screw extruder to continuously wash, de-water and dry latex particles from a latex emulsion. The system further comprises one or more mechanical filters comprising counter-rotating, fully-intermeshing twin screw extruders for removing water from the stream.

Hagberg's apparatus and process is suited for the isolation of latex particles from a latex/water emulsion at ambient temperatures, a completely different art than isoolefin-diolefin suspension polymerizations. Isoolefin-diolefin suspension polymerization is conducted at low temperature in a non-aqueous medium in conjunction with a flash tank to remove reaction medium, whereas Hagberg's latex process is conducted at much higher temperature in an aqueous medium without the use of a flash tank. Hagberg's non-intermeshing twin screw extruder design is suitable for conveying rubber in the latex system, but not for conveying rubber in the isoolefin-diolefin system, in part due to the more extreme fouling problem in isoolefin-diolefin systems.

GB 561,324 (the '324 patent) to Standard Oil and Development Company issued on May 15, 1944 describes a low temperature polymerization process for the manufacture of butyl rubber. Polymerization product is subjected to kneading as it is formed and conveyed to an extruder. Reaction medium is volatilized mainly in the kneaders. The rubber then passes to the extruder where any remaining reaction medium including residual monomers is removed as a vapor. Reaction medium is recycled as a vapor, which requires cooling before it enters the reaction vessel. This process also makes use of evaporative cooling but a low boiling component (ethylene) is added to give the desired low operating temperature.

SUMMARY OF THE INVENTION

There is provided a process for producing an isoolefin-diolefin rubber including: reacting an isoolefin with a diolefin in a liquid non-aqueous reaction medium in a reaction vessel at a temperature in a range of from −110° C. to −50° C. to produce an isoolefin-diolefin rubber in a slurry; expressing the slurry in a separation zone to separate at least part of the liquid non-aqueous reaction medium from the isoolefin-diolefin rubber; transporting the separated liquid non-aqueous reaction medium off stream; and, transporting residual slurry to a slurry processing zone.

There is further provided an apparatus for producing an isoolefin-diolefin rubber including: a reaction vessel for preparing a slurry of an isoolefin-diolefin rubber in a liquid non-aqueous reaction medium at a temperature in a range of from −110° C. to −50° C.; an expression separator in fluid communication with the reaction vessel for separating at least part of the liquid non-aqueous reaction medium from the rubber; a slurry processing vessel in fluid communication with the expression separator for receiving residual slurry; and, a transport means in fluid communication with the expression separator at a point between the reaction vessel and the slurry processing vessel for transporting the separated liquid non-aqueous reaction medium off stream.

There is yet further provided an apparatus for producing an isoolefin-diolefin rubber including: a reaction vessel for preparing an isoolefin-diolefin rubber in a liquid non-aqueous reaction medium at a temperature in a range of from −110° C. to −50° C.; and, a self-cleaning fully intermeshing twin screw conveyor in fluid communication with the reaction vessel for transferring the rubber from the reaction vessel to a slurry processing vessel.

There is still yet further provided a discharge means for transferring an isoolefin-diolefin rubber slurry having a temperature in a range of from −110° C. to −50° C. from a reaction vessel to a slurry processing vessel including: a barrel having a first end and a second end; an inlet proximal the first end for receiving the rubber into the barrel; an outlet proximal the second end for discharging the rubber from the barrel; a set of fully intermeshing, co-rotating screws inside the barrel having reverse flights at the second end beyond the outlet; and, means for rotating the screws.

The processes and apparatuses of the present invention advantageously reduce blockage in the discharge means, which reduces down time associated with such blockage. Furthermore, the processes and apparatuses of the present invention permit recovery of reaction material and energy in the reaction system, thereby increasing the cost effectiveness of the process. Energy usage may be reduced by up to about 30%, and possibly more, in the processes of the present invention.

In accordance with the present invention, an apparatus for producing isoolefin-diolefin rubbers includes a reaction vessel, a slurry processing vessel and a self-cleaning discharge means between the reaction vessel and the slurry processing vessel for transferring rubber slurry from the reaction vessel to the slurry processing vessel. The reaction vessel, self-cleaning discharge means and slurry processing vessel may be integrated into an otherwise conventional isoolefin-diolefin rubber process.

The reaction vessel may be any vessel suitable for the production, preferably continuous production of isoolefin-diolefin rubbers. The reaction vessel must be able to maintain an appropriate reaction temperature, typically in the range of from −110° C. to −50° C. Cooling is normally achieved by evaporating liquid ethylene external to the reaction vessel. Recycled cold liquid reaction medium may be used to pre-cool feeds to the reaction vessel. Alternatively to, or in conjunction with pre-cooling feeds, recycled cold liquid reaction medium may be used to assist in condensing compressed ethylene vapor bringing it closer to the reaction temperature. The reaction vessel typically comprises an outlet in fluid communication with a discharge means for discharging rubber slurry out of the reaction vessel. Rubber slurry produced in the reaction vessel comprises a high viscosity rubber portion and a lower viscosity liquid reaction medium portion.

In a first aspect, the function of the self-cleaning discharge means is to convey rubber slurry from the reaction vessel to the slurry processing vessel. The self-cleaning nature of the conveyor obviates the need to employ other methods to prevent sticking of the rubber to the inside of the discharge means, for example, steam jacketing is not required.

In a second aspect, a discharge means may also act as an expression separator to separate the high viscosity rubber from at least some of the lower viscosity reaction medium. As is discussed below, separating the rubber from the reaction medium permits recovery of both the material of the reaction medium and the energy associated with the low temperature of the reaction medium.

A self-cleaning discharge means may be any suitable self-cleaning means for conveying rubber slurry from the reaction vessel to the slurry processing vessel. In one embodiment, the self-cleaning discharge means is a self-cleaning screw conveyor, preferably a self-cleaning twin screw conveyor, more preferably a self-cleaning fully intermeshing twin screw conveyor, even more preferably a self-cleaning fully intermeshing co-rotating twin screw conveyor, and yet most preferably a self-cleaning fully intermeshing co-rotating twin screw extruder. Fully intermeshing co-rotating twin screws are generally more efficient in conveying material than fully intermeshing counter-rotation designs. In the latter, rubber is subject to what is essentially a milling action between the flight tip of one screw and the root of the other, leading to high power usage and unnecessary working of the rubber.

In the case of a discharge means having a set of fully intermeshing co-rotating screws, for example, a self-cleaning fully intermeshing co-rotating twin screw extruder, the discharge means comprises a set of fully intermeshed screws inside a barrel. The preferred arrangement is to have the discharge means operating in a reverse manner to that used in a conventional extrusion process. The screws may be arranged to draw rubber slurry out of the reaction vessel, preferably at the top of the reaction vessel, through an inlet into the barrel and then to convey the slurry to the slurry processing vessel. Discharge to the slurry processing vessel may be accomplished by any suitable method, for example, by having an outlet (or series of outlets) in the barrel, preferably pointing downwards into the slurry processing vessel.

Furthermore, seals for the screw shaft may be located on the opposite side of the slurry processing vessel from the reaction vessel and a means for rotating the screws (e.g. a drive comprising a motor and gearing) located beyond the seals. A reverse flighted screw section may be situated beyond the outlet (or series of outlets) in the barrel to ensure that slurry is discharged into the slurry processing vessel through the outlet (or series of outlets) and does not reach the seals. This arrangement allows the seals and the means for rotating the screws to be located away from the low temperature reactor region, making design and materials selection significantly simpler. A means for accommodating thermal movement caused by the temperature difference between the cool reactor and warm slurry processing vessel may be inserted between the discharge means and the slurry processing vessel. Examples of such a means for accommodating thermal movement are a sliding flange or a bellows joint. It will be evident to one skilled in the art that other arrangements are also possible for the discharge of rubber slurry from the screws into the slurry processing vessel.

The slurry processing vessel may be any vessel useful for further processing rubber slurry. In a butyl rubber plant, the slurry processing vessel may be a flash tank. In applications where the rubber is to be halogenated and the rubber has to be in solution form, the discharge means may be equipped with a solvent inlet so that the necessary solvent can be introduced to start the dissolution process. Furthermore, discharge would not be into a flash tank containing heated water, but into a dissolution vessel that allows for dissolution of the rubber to be completed and for residual volatile reaction medium to evaporate.

A discharge means may also act as an expression separator, particularly where recovery of cold liquid reaction medium is desirable. Preferably, such an expression separator is self-cleaning. Expression "is the separation of liquid from a two-phase solid-liquid system by compression under conditions that permit the liquid to escape while the solid is retained between the compressing surfaces. Expression is distinguished from filtration in that pressure is applied by movement of the retaining walls instead of by pumping the material into a fixed space" (Perry's Chemical Engineers' Handbook, Sixth Edition, McGraw-Hill Inc. (1984) p. 19-103). Any suitable expression separator may be used. Expression and expression separators are described in Perry's Chemical Engineers' Handbook, Sixth Edition, McGraw-Hill Inc. (1984) pp. 19-103 to 19-107, the disclosure of which is herein incorporated by reference. Screw separators are preferred, more preferably screw extruders, even more preferably twin screw extruders. Particularly preferred is a fully intermeshing twin screw extruder, for example a fully intermeshing co-rotating twin screw extruder or a fully intermeshing counter-rotating twin screw extruder. A fully intermeshing co-rotating twin screw extruder is more preferred, as it is more efficient, it consumes less power and it subjects the rubber to less milling action.

In the case where the expression separator is a fully intermeshing co-rotating twin screw extruder, the preferred arrangement is similar to, but more complex than, the geometry described above for the set of fully intermeshing co-rotating screws used solely to convey rubber from the reaction vessel to the flash tank. When used as an expression separator, a fully intermeshing co-rotating twin screw extruder may comprise a first section in which the screw geometry is designed to convey the full flow of rubber slurry from the reaction vessel. Part way along the screws, the geometry may change so that the screws have only sufficient capacity to convey the rubber portion, the rubber still being swollen by absorbed liquid reaction medium. In this manner, the liquid reaction medium is expressed from the rubber slurry, thereby effecting separation of at least part of the liquid reaction medium from the rubber. Geometry changes may include, for example, changes to flight pitch, flight lead and land length, among others. The rubber portion is then discharged into the slurry processing vessel, for example through an outlet (or outlets) as described above.

A transport means in fluid communication with the expression separator at a point (or points) between the reaction vessel and the slurry processing vessel may be used to transport separated liquid reaction medium off stream from the expression separator. Transporting the separated liquid reaction medium off stream provides a large variety of opportunities for recovery and/or recycling. For example:
  a. All or part of the liquid reaction medium may be recycled back into the reaction vessel. By returning this cold medium to the reaction vessel, the amount of fresh feed to the reaction vessel is correspondingly reduced, therefore less energy is needed to cool that feed. However, the fresh feed does need to be higher in monomer level to compensate for depleted monomer level in the reaction medium that is returned. Furthermore, the load on the plant's vapor recycle system is greatly reduced, particularly in view of the necessity to remove water from the vapor being recycled from the flash tank.
  b. All or part of the liquid reaction medium may be subjected to a purification step before being recycled back into the reaction vessel to reduce the likelihood of contamination and to reduce accumulation of poisons to the polymerization reaction in the reaction vessel. Purification may be accomplished, for example, by filtration, by adsorbents (e.g. molecular sieves, aluminosilicates), by a combination thereof, etc. Purification of the liquid reaction medium may be conducted in order to, for example, remove accumulated reaction by-products, separate catalyst residues from the separation stream, etc. All or part of the purified reaction medium may be recycled back into the reaction vessel.

The energy of the liquid reaction medium may be recovered in a variety of ways. For example:
  a. The liquid reaction medium may be transported to a separate heat exchanger for cooling feeds of one or more reaction components, particularly for cooling the mixed feed.
  b. The liquid reaction medium may be used to help cool the reaction vessel, for example, by transporting it to a heat exchanger to assist in condensing compressed reactor coolant (e.g. ethylene vapor) bringing the coolant closer to the reaction temperature.
  c. The liquid reaction medium may be recycled back into the reaction vessel, as mentioned above.
  d. The transport means itself may be used as a heat exchanger for cooling reactor feeds.

Any combination of the above may be employed and one skilled in the art can easily determine other ways in which the separated liquid reaction medium may be used to reduce the overall cost of the process.

The transport means may be any suitable means for transporting separated liquid reaction medium off stream. It may be a simple conduit, a conduit with a filter, a pump, a combination thereof, etc. In one embodiment, the transport means is a mechanical filter. A mechanical filter advantageously provides further separation of the liquid reaction medium from the rubber portion of the rubber slurry, in addition to acting as a transport means for separated liquid reaction medium. In one embodiment, the mechanical filter is a screw conveyor, for example, a fully intermeshing counter-rotating twin screw extruder or a fully intermeshing co-rotating twin screw extruder. A mechanical filter is capable of permitting passage of the liquid reaction medium through it while forcing rubber back into the expression separator. Preferably, the transport means is a fully intermeshing counter-rotating twin screw extruder, wherein the screws operate to push the high viscosity rubber phase back into the expression separator while the clearance over the screw flights and between the screws is such that lower viscosity liquid reaction medium is allowed to pass by.

In one embodiment, the slurry processing vessel is a flash tank (or flash drum as it may be called). A flash tank is generally a large tank having a pool of water, preferably hot water, at the bottom. The water in the flash tank may be heated, for example, by steam. Rubber slurry discharged from the discharge means falls into the water where the reaction medium and residual monomers are vaporized leaving the rubber in the form of a coarse slurry in hot water. If required, steam jets can be used to break up the stream of rubber slurry as it emerges from the discharge means. Rubber from the discharge means may be discharged anywhere in the flash tank, although it is generally preferred to discharge the rubber near the middle of the lateral cross-sectional area of the tank in order to reduce the chance of rubber sticking to the sides of the flash tank.

Isoolefin-diolefin rubbers are generally known in the art. Such rubbers, include, for example, butyl rubber (IIR), bromobutyl rubber (BIIR), chlorobutyl rubber (CIIR), among others. Butyl rubber may be formed by suspension copolymerization of a monomer (e.g. isobutylene (97-99.5 wt %) with small amounts of isoprene (3.0-0.5 wt %)) in a liquid non-aqueous reaction medium containing a catalyst. Other comonomers or termonomers may be used to change the properties of the rubber. The polymerization reaction is conducted, preferably in a continuous reactor, at a temperature in a range of from about $-110°$ C. to $-50°$ C., for example from about $-110°$ C. to $-70°$ C., or from about $-100°$ C. to $-90°$ C. Rubber formed in the reaction is generally insoluble in the reaction medium and forms a suspension (slurry) of fine particles in the reaction medium. While the rubber is said to be in solid or particulate form, one skilled in the art understands that such rubber solids or particles are very soft, being swollen by absorbed liquids so that they form a high viscosity phase. Halobutyl rubbers (e.g. chlorobutyl rubber and bromobutyl rubber) may be formed by halogenating butyl rubber in a manner generally known to one skilled in the art.

Any suitable liquid non-aqueous reaction medium may be used, for example, alkyl halides, sulfuryl chloride, etc. Alkyl halides are preferred, particularly methyl chloride. Any suitable catalyst may be used, for example Friedal-Craft's catalysts, syncatalysts, etc. Aluminum chloride is a preferred catalyst. The temperature is in a range of from about $-110°$ C. to $-50°$ C., for example from about $-110°$ C. to $-70°$ C., or from about $-100°$ C. to $-90°$ C. The process is generally conducted at around ambient pressure, e.g. about 0.7 atm to 1.2 atm.

The rubber content of the rubber slurry produced in the reaction vessel is ideally as high as possible to reduce the need to recycle reaction medium. However, there is generally a practical limit to the rubber content of the slurry coming out of the reaction vessel. Generally, the rubber content of the slurry is about 10%-40% by weight. Rubber content may be from about 20%-30% by weight or about 25% by weight. "Particle" size of the rubber may vary considerably, but is typically on the order of about 20 microns. Agglomeration of particles may occur that increases the particles size, particularly during subsequent processing of the slurry.

When recycling is not done, rubber slurry produced in the reaction vessel is conveyed to a slurry processing zone by a discharge means as described above. When recycling of liquid reaction medium and/or energy is done, rubber slurry exiting the reaction vessel enters a self-cleaning separation zone where the slurry is expressed to separate at least part of the liquid non-aqueous reaction medium from the rubber. The separated liquid reaction medium is transported off stream. Remaining slurry comprising residual liquid reaction medium and rubber are transported to the slurry processing zone. Examples of apparatuses for expressing the rubber slurry and for transporting separated reaction medium off stream have been previously described.

In one embodiment, the slurry processing zone may be in a flash tank. In a flash tank, rubber slurry comes into contact with hot water and liquid reaction medium including unreacted monomers is vaporized, leaving the rubber in the form of a coarse slurry in hot water. Small amounts of antiagglomerate and stabilizer may be added to the rubber slurry at this stage to prevent further agglomeration of the slurry particles and to protect the rubber from degradation during further processing. A base, for example sodium hydroxide, may be added to neutralize catalyst residues. Vaporized reaction medium including unreacted monomers is removed from the flash tank and then dried, compressed (cooled) and purified before being recycled back into the reaction vessel.

Further processing and apparatus elements in an isoolefin-diolefin rubber process are conventional and are well known to one skilled in the art and may be used in conjunction with the inventive apparatuses and processes described herein.

BRIEF DESCRIPTION OF THE DRAWING

In order that the invention may be more clearly understood, preferred embodiments thereof will now be described in detail by way of example, with reference to the accompanying drawing in which.

DETAILED DESCRIPTION OF THE DRAWINGS

Figure 1:
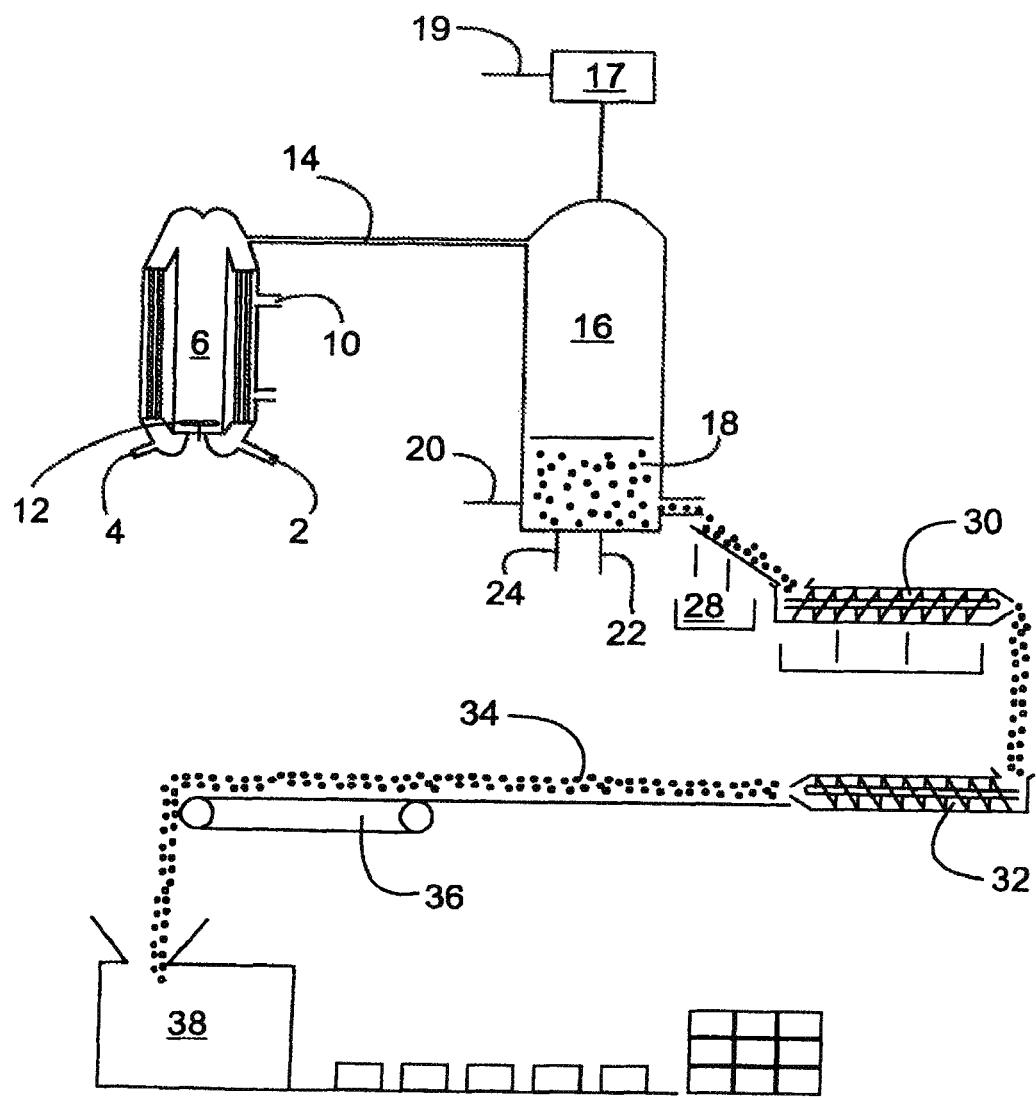
FIG. 1 is a schematic diagram of a prior art process for production of butyl rubber.

Referring to FIG. 1, a prior art commercial process for total production of butyl rubber is depicted. A feed stream of isobutylene and isoprene monomers mixed in methyl chloride 2 and a feed stream of aluminum chloride catalyst dissolved in methyl chloride 4 are continuously charged to a butyl rubber reactor 6 at a temperature below about $-90°$ C. Isobutylene and isoprene copolymerize at a temperature below about $-90°$ C. in the presence of the catalyst to form a suspension (slurry) of butyl rubber in methyl chloride and residual monomers. The contents of reactor 6 are cooled by evaporation of liquid ethylene in a cooling system 10. The slurry of butyl rubber in the reactor 6 is subjected to high flow velocities by an impeller 12 to reduce rubber build-up on the inner surfaces of the reactor. Rubber slurry having a rubber concentration of about 25 wt % is discharged from the top of the reactor 6 through a steam jacketed discharge line 14 into a flash tank 16. At the bottom of the flash tank 16 is a pool of hot water 18 at a temperature of about 75° C. continuously heated by a flow of steam through line 20. When cold rubber slurry contacts the hot water, methyl chloride and residual isobutylene and isoprene are vaporized while the butyl rubber forms a coarse slurry in hot water. Gaseous methyl chloride, isobutylene and isoprene are drawn out the top of the flash tank 16 along with water vapor. The vapors are then subjected to a number of processing steps 17 including drying, compressing and purifying, leaving the bulk as a purified liquid that is recycled through line 19 into the feed stream 2. A stream 22 of antiagglomerate (0.4-1.0 wt % based on rubber of a mixture of stearic acid and zinc stearate) and stabilizer (0.02-0.15 wt % alkylated diphenyl amine, alkylated phenyl amine, alkylated phenol or alkylated phenyl phosphite) are charged to the hot water in the flash tank 16. A stream of sodium hydroxide 24 is charged to the hot water as well to neutralize catalyst residues. The coarse rubber slurry is separated from gross water 28 by screening on a de-watering screen, and then fed successively into a de-watering extruder 30 and a drying extruder 32 where most of the remaining water is squeezed out. In some cases, one or more additional stripper vessels may be used after the flash tank to further remove residual volatile materials before the rubber is sent to the de-watering screen. On leaving the drying extruder 32, hot compressed rubber is exploded into a fluffy, porous crumb 34 by steam created from the residual water, which has been heated under pressure. Crumb 34 is cooled and remaining water is allowed to evaporate on a conveyor 36. Crumb 34 is then fed into balers 38 where it is compacted into bales, wrapped in polyethylene wrapper and stacked for transport.

Figure 2:
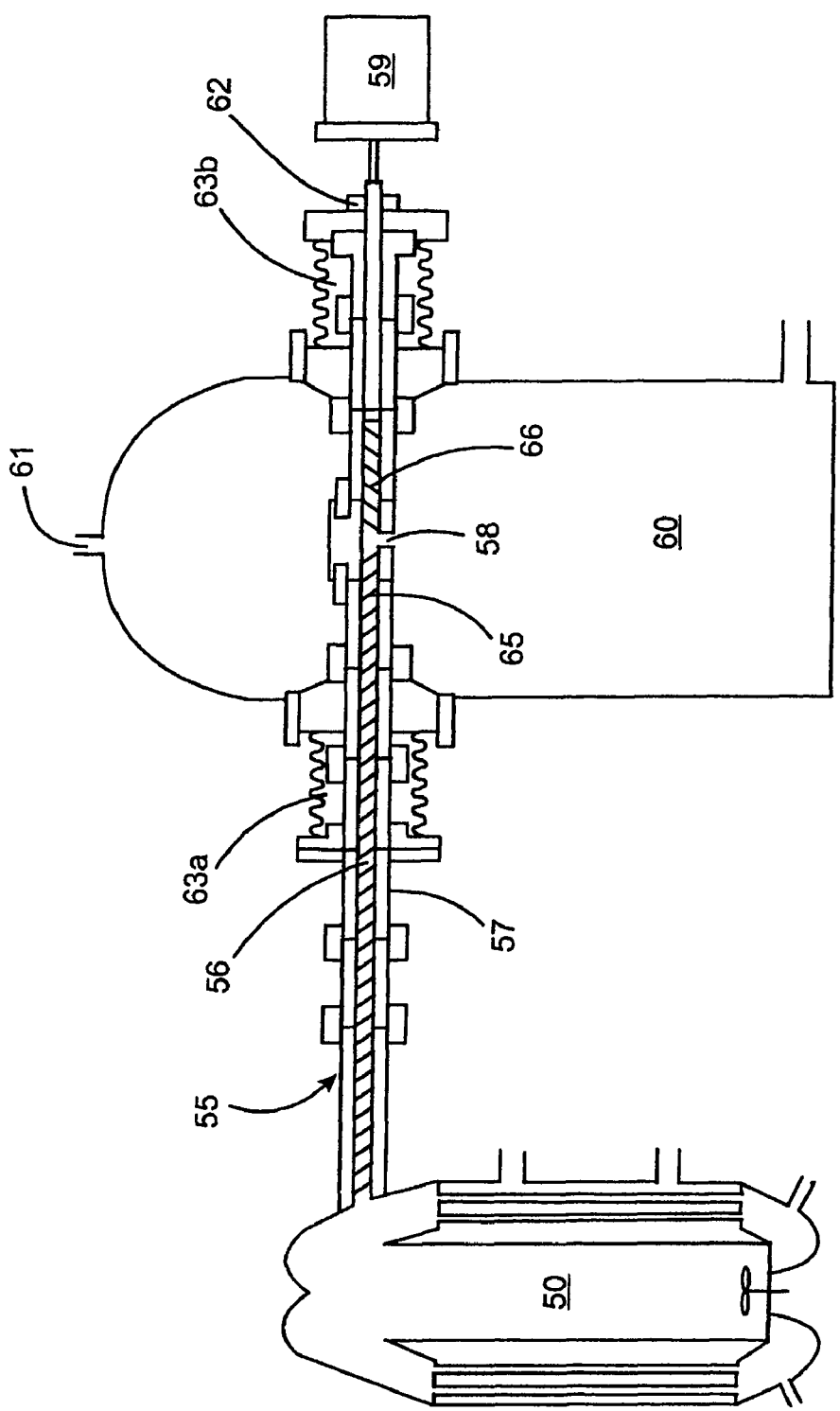
FIG. 2 is a schematic diagram of a first embodiment of an apparatus according to the present invention in which a self-cleaning co-rotating fully intermeshing twin screw extruder is used as a discharge system from a butyl rubber reactor to a flash tank.

Referring to FIG. 2, a schematic diagram of a first embodiment of an apparatus according to the present invention is depicted. The apparatus provides for simple discharge of rubber slurry from a butyl rubber reactor to a flash tank. A butyl rubber reactor 50 is in fluid communication with a self-cleaning fully intermeshing co-rotating twin screw extruder 55, which includes a pair of screws 56, a barrel 57, an aperture 58 in the bottom of the barrel and a drive unit 59 comprising a motor and gearing for rotating the screws. The extruder 55 may be built in sections to facilitate manufacture, and assembled into one unit. The extruder 55 traverses a flash tank 60 such that the aperture 58 is near the middle of the flash tank. The extruder 55 is mounted on the flash tank 60 with bellows joints 63a, 63b acting to accommodate thermal movement of the apparatus. Rotating shaft seals 62 (only one shown) for each screw are situated where the screw shafts exits the flash tank, and serve to prevent the leakage of vapors or ingress of air. The closed top of the flash tank 60 includes a gas line outlet 61 through which gaseous methyl chloride and gaseous residual isobutylene and isoprene monomers are drawn out of the flash tank. Rubber slurry is discharged from the top of the reactor 50 and conveyed through the extruder 55 by a set of flights 65 pitched to permit displacement of the slurry in the extruder. Self-wiping action of the fully intermeshed co-rotating screws 56 prevents rubber from sticking to surfaces inside the extruder, thereby preventing plugging of the extruder. Upon reaching the aperture 58, rubber slurry falls into the flash tank 60 and contacts hot water (not shown) at the bottom of the flash tank whereupon methyl chloride and residual isobutylene and isoprene monomers are vaporized. To prevent rubber slurry from passing by the aperture 58, the screws 56 comprise a set of reverse flights 66 beyond the aperture. The reverse flights 66 are pitched to push rubber slurry back in the extruder and out through the aperture.

Figure 3A:
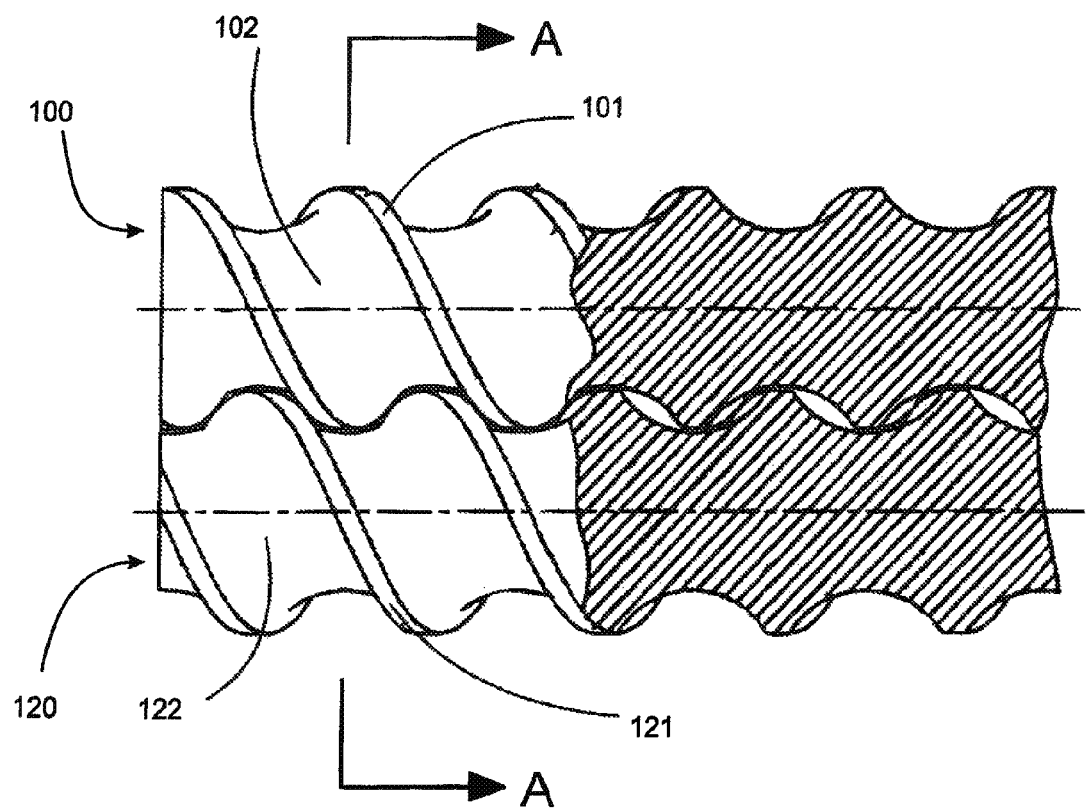
FIG. 3A is a plan view of a section of the screws of a self-cleaning fully intermeshing co-rotating twin screw extruder.
Figure 3B:
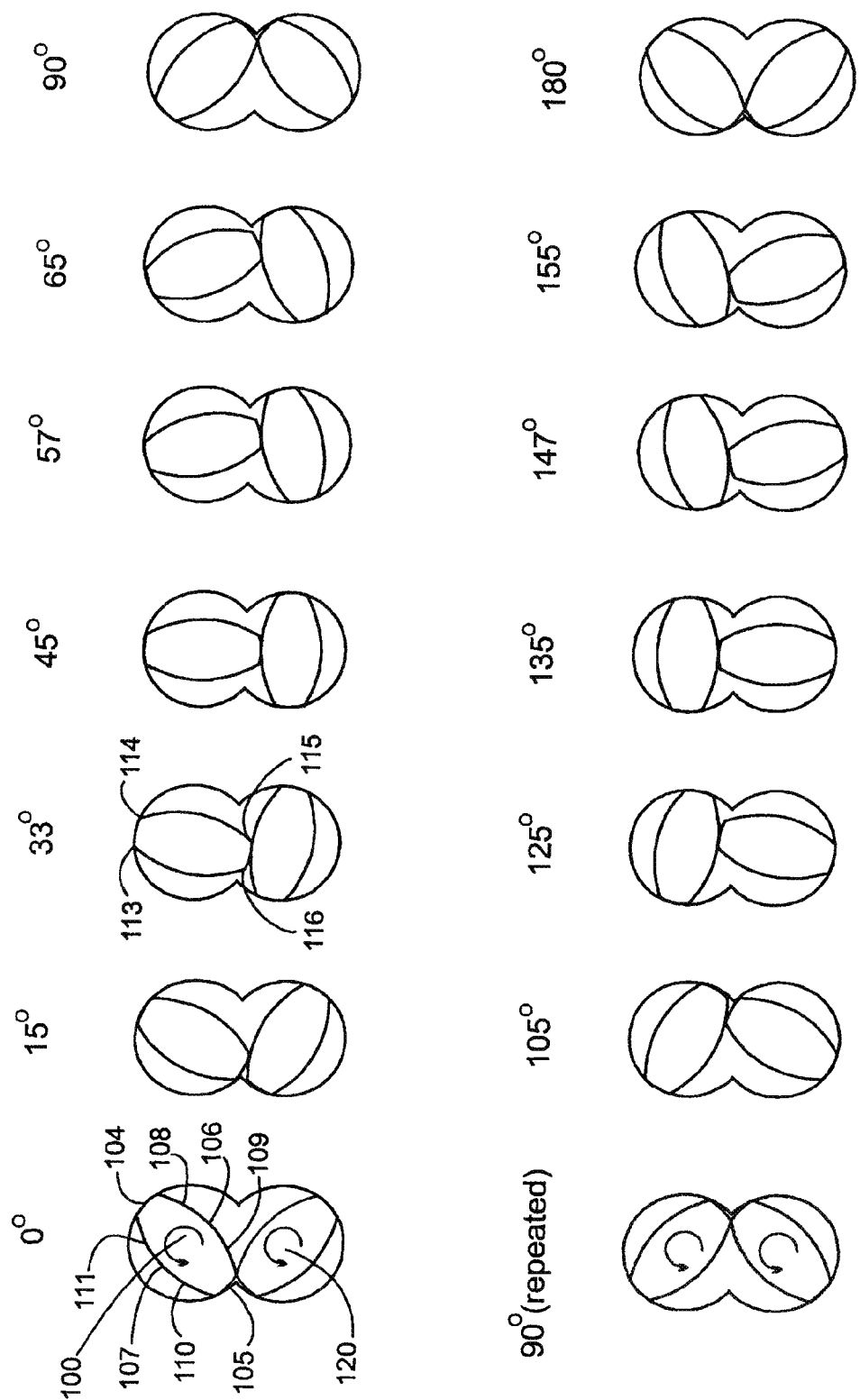
FIG. 3B is a series of end cross-sectional views of the screws of FIG. 3A in a number of rotation positions.

Reference is made to FIGS. 3A and 3B to further describe a fully intermeshing co-rotating pair of screws. FIG. 3A is a plan view of a section of the screws in which rubber slurry is conveyed along the extruder. A first screw 100 includes one or more channels, one marked as 102, and a first set of flights, one flight marked as 101. A second screw 120 includes one or more channels, one marked as 122, and a second set of flights, one flight marked as 121. In this embodiment, a two-start arrangement is shown. Similar action can be obtained with screws having a single start or multiple starts greater than two.

The two screws intermesh so that as they rotate the tip of one flight on one of the screws wipes one of the channels of the other screw. Rotational movement of the two screws is synchronized by a geared drive to the screws. The two sets of flights fully intermesh so that the tip of one flight on one set of flights wipes against the face of the neighboring flight on the second set of flights. As the screws rotate, at a particular axial position, the wiping action alternates between the first and second sets of flights. This can be more clearly seen in FIG. 3B, which is a series of cross-sectional end views of the twin screw of FIG. 3A taken through the section A-A at a number of different rotational positions, i.e. 0°, 15°, 33°, 45°, 57°, 65°, 90°, 105°, 125°, 135°, 147°, 155° and 180°. In the following discussion, it will be evident that reference numerals labeled on any one rotational position are also correspondingly applicable to the other rotational positions.

Still referring to FIG. 3B, it can be seen that the cross-section of each screw generally comprises three portions. Reference is made to the first screw 100, however, a similar description is also applicable to the second screw 120. Referring to the 0° rotational position, the first screw 100 comprises two short cylindrical portions 104,105 that includes the flights, then in the theoretically correct profile, two more cylindrical portions 106,107 that comprise the roots, and four generally elliptical portions 108,109,110,111 that form the remainder of the channels. In practice, for manufacturing convenience, the geometry does vary from that which is theoretically correct but this is of little detriment so long as the deviation is not large. Referring to the 33° rotational positions, there are four points of transition 113,114,115,116 between the cylindrical flight portions and the elliptical portions. The direction of rotation of the screws is represented by the arrows within the two screws 100 and 120. During rotation from the 0° rotational position to the 90° rotational position, the lower flight of the first screw 100 wipes the channel of the second screw 120. The wiping action can be viewed as passing through three phases. In the first phase from 0° to 33°, the point 115 on the first screw scrapes the channel of the second screw. In the second phase from 33° to 57°, the cylindrical portion 105 on the first screw scrapes the root of the second screw. In the third phase from 57° to 90°, the point 116 on the first screw scrapes the channel of the second screw.

It is evident that during rotation from the 90° rotational position to the 180° rotational position, the upper flight on the second screw 120 wipes the channel of the first screw 100 in a similar manner as described above. It is also evident that rotation between 180° and 270° and between 270° and 360° follows a similar pattern. For example, during the rotation between 180° and 270°, the points 113,114 and the cylindrical portion 104 of the first screw 100 will wipe the channel of the second screw 120. Thus, the 360° rotational cycle of the screws may be viewed as four 90° cycles in which the first and second screws alternately wipe each other. The same type of self-wiping action may be observed at any cross-section A-A taken along the length of the screws.

As indicated previously, flight tips are cylindrical in form. Their diameter is such as to provide a clearance inside the cylindrical portions of the barrel and sufficient width has to be allowed so that adequate bearing surface is provided for successful mechanical operation.

Figure 4:
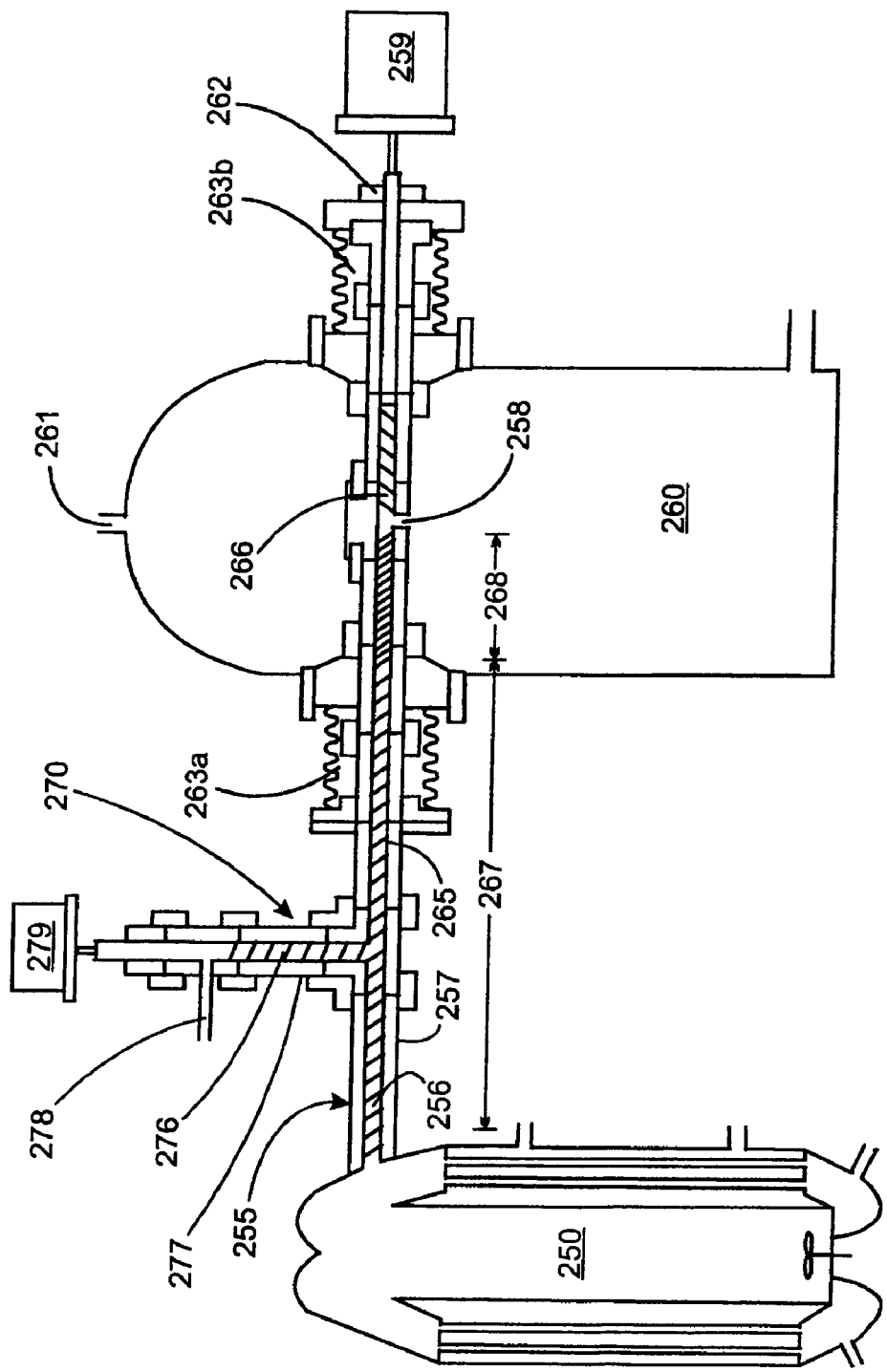
FIG. 4 is a schematic diagram of a second embodiment of an apparatus according to the present invention in which a fully intermeshing counter-rotating twin screw extruder is used as a mechanical filter in conjunction with a self-cleaning co-rotating fully intermeshing twin screw extruder discharge system.

Referring to FIG. 4, a schematic diagram of a second embodiment of an apparatus according to the present invention is depicted. The apparatus provides for both discharge of rubber slurry from a butyl rubber reactor to a flash tank, and for separation of at least part of the liquid reaction medium from the rubber. A butyl rubber reactor 250 is in fluid communication with a self-cleaning fully intermeshing co-rotating twin screw extruder 255, which includes a pair of screws 256, a barrel 257, an aperture 258 in the bottom of the barrel and a drive unit 259 comprising a motor and gearing for rotating the screws. The extruder 255 may be built in sections to facilitate manufacturing, and assembled into one unit. The extruder 255 traverses a flash tank 260 such that the aperture 258 is near the middle of the flash tank. The extruder 255 is mounted on the flash tank 260 with bellows joints 263a, 263b acting to accommodate thermal movement of the apparatus. Rotating shaft seals 262 (only one shown) for each screw are situated where the screw shafts exit the flash tank, and serve to prevent the leakage of vapors or ingress of air. The closed top of the flash tank 260 includes a gas line outlet 261 through which gaseous methyl chloride and gaseous residual isobutylene and isoprene monomers are drawn out of the flash tank. A mechanical filter in the form of a fully intermeshing counter-rotating twin screw extruder 270 is in fluid communication with the extruder 255.

Rubber slurry is discharged from the top of the reactor 250 and conveyed through the extruder 255 by a set of flights 265 pitched to permit displacement of the slurry in the extruder and spaced to permit expression of the slurry so that the high viscosity rubber phase is conveyed forward along the extruder while the low viscosity liquid reaction medium can leak back through the screw channels. The screw channels of a fully intermeshing co-rotating twin screw extruder describe a helical flow path through which liquid reaction medium may flow back through the extruder. The set of flights 265 may include a first zone 267 in which the flights are spaced relatively widely apart to accommodate a relatively large volume of liquid reaction medium passing through the extruder 255. Farther along the extruder towards the aperture 258, the set of flights 265 comprises a second zone 268 in which the flights are spaced closer together. The change in flight pitch results in a pressure gradient, which results in expression separation of the liquid reaction medium. In this manner, a separation is effected between the rubber and the reaction medium in the extruder. Self-wiping action of the fully intermeshed co-rotating screws 256 prevents rubber from sticking to surfaces inside the extruder, thereby preventing plugging of the extruder.

At a point along the first zone 267, a transport means embodied as a mechanical filter in the form of a fully intermeshing counter-rotating twin screw extruder 270, for example the Mech Filt™ extruder from NFM/Welding Engineers Inc (Massillon, Ohio, USA), is in fluid communication with the co-rotating twin screw extruder 255. The counter-rotating twin screw extruder 270 comprises a pair of screws 276, a barrel 277, an outlet 278 in the side of the barrel and a drive unit 279 including a motor and gearing for rotating the screws. The screws of the counter-rotating twin screw extruder 270 are designed to push rubber back into the co-rotating twin screw extruder 255. However, since the counter-rotating twin screw extruder 270 has narrow clearances between the screws and between the flights of the screws and the barrel, low viscosity liquid is able to pass up through the extruder 270, whereas the rubber is not. The rubber is thereby retained within extruder 255 and not allowed to exit through the extruder 270. The separated liquid reaction medium is transported off stream and discharged from the counter-rotating twin screw extruder 270 via the outlet 278.

Rubber and residual liquid reaction medium which continued through the co-rotating twin screw extruder 255 eventually reaches the aperture 258, falls into the flash tank 260 and contacts hot water (not shown) at the bottom of the flash tank whereupon methyl chloride and residual isobutylene and isoprene monomers are vaporized. To prevent rubber from passing by the aperture 258, the screws 256 include a set of reverse flights 266 beyond the aperture. The reverse flights 266 are designed to push rubber slurry back in the extruder 255 and out through the aperture 258.

Figure 5:
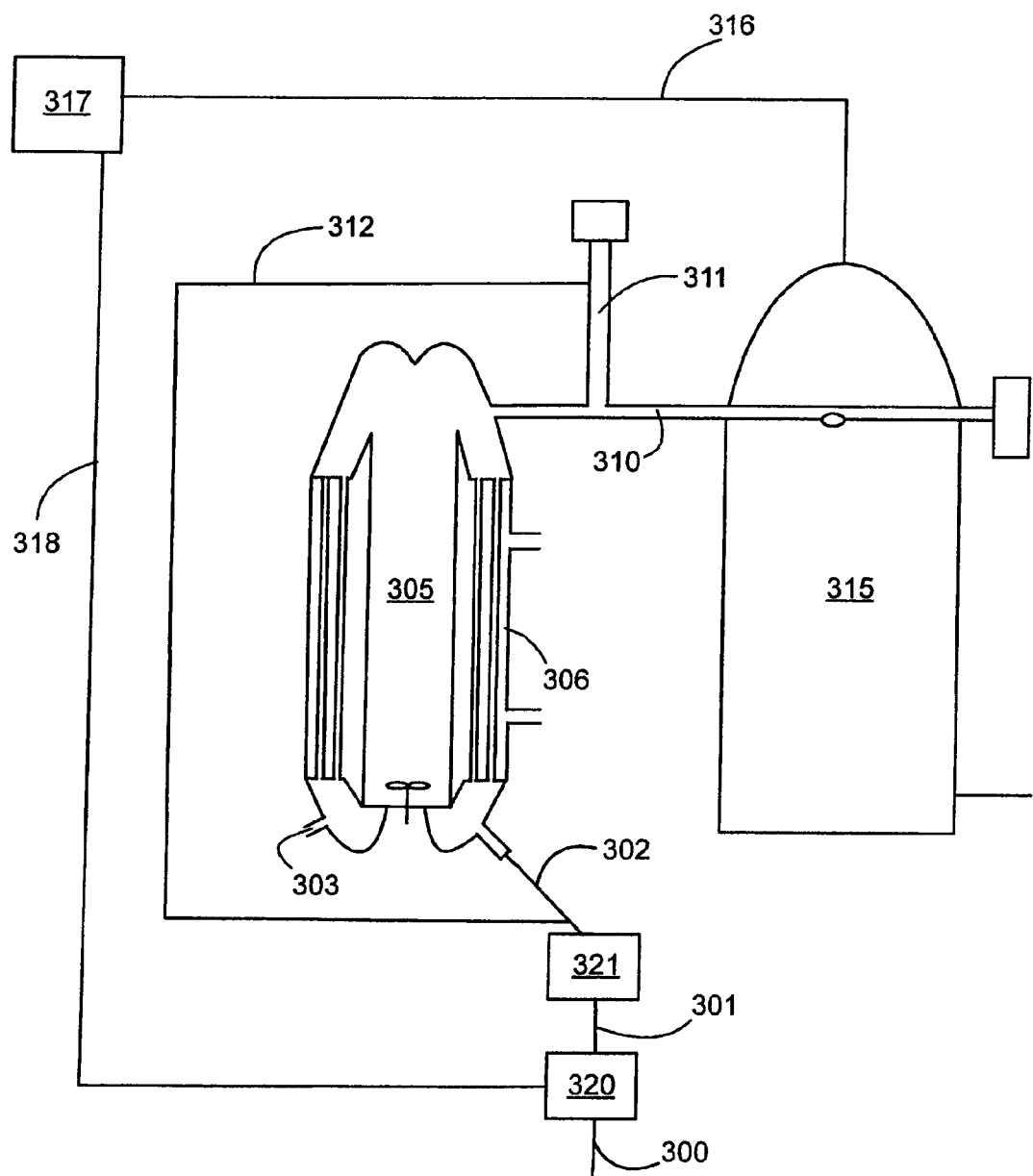
FIG. 5 is a schematic diagram of one embodiment of a process for producing butyl rubber in accordance with the present invention in which liquid reaction medium is recycled back into a reactor; and, FIG. 6 is a schematic diagram of another embodiment of a process for producing butyl rubber in accordance with the present invention in which the energy of liquid reaction medium is used to cool a mixed feed stream.

FIG. 5 depicts one embodiment of a process for producing butyl rubber in accordance with the present invention in which liquid reaction medium is recycled back into a butyl rubber reactor. Fresh feeds 300 together with recycled materials 318 go into a storage and blending system 320, which operates at close to ambient temperature. A mixed feed 301, including isobutylene and isoprene monomers in liquid methyl chloride in proportions required by the process, is transported from the storage and blending system 320 to a feed cooler 321 where the mixed feed is cooled to below about −90° C. After cooling, the mixed feed is joined by cold separated liquid reaction medium from line 312 to form a combined feed stream 302. The cold combined feed stream 302 and a cold (below about −90° C.) catalyst feed stream 303 of aluminum chloride catalyst in liquid methyl chloride are continuously fed into a reactor 305 where polymerization occurs at a temperature normally maintained in a range from about −90° C. to about −98° C. by a cooling system 306 utilizing the evaporation of liquid ethylene. Rubber slurry produced during polymerization is transported to a self-cleaning co-rotating fully intermeshing twin screw extruder 310 where rubber phase is separated by expression from the liquid reaction medium. Residual methyl chloride and monomers are flashed from the rubber by hot water at a temperature of about 75° C. in a flash tank 315. Methyl chloride and monomer vapors are transported through line 316 and subjected to a number of processing steps 317, including drying, compressing and purifying, leaving the bulk as a purified liquid that is recycled through line 318 into the storage and blending system 320 where it is mixed with the fresh feeds 300. Cold separated liquid reaction medium is transported off stream from the co-rotating fully intermeshing twin screw extruder 310 by a counter-rotating fully intermeshing twin screw extruder 311, then transported through line 312 to join the mixed feed forming the combined feed stream 302 that enters the reactor 305. Recycling of the cold liquid reaction medium results in less energy being used to cool the reduced quantity of mixed feed. Other features of the process are known to one skilled in the art.

Figure 6:
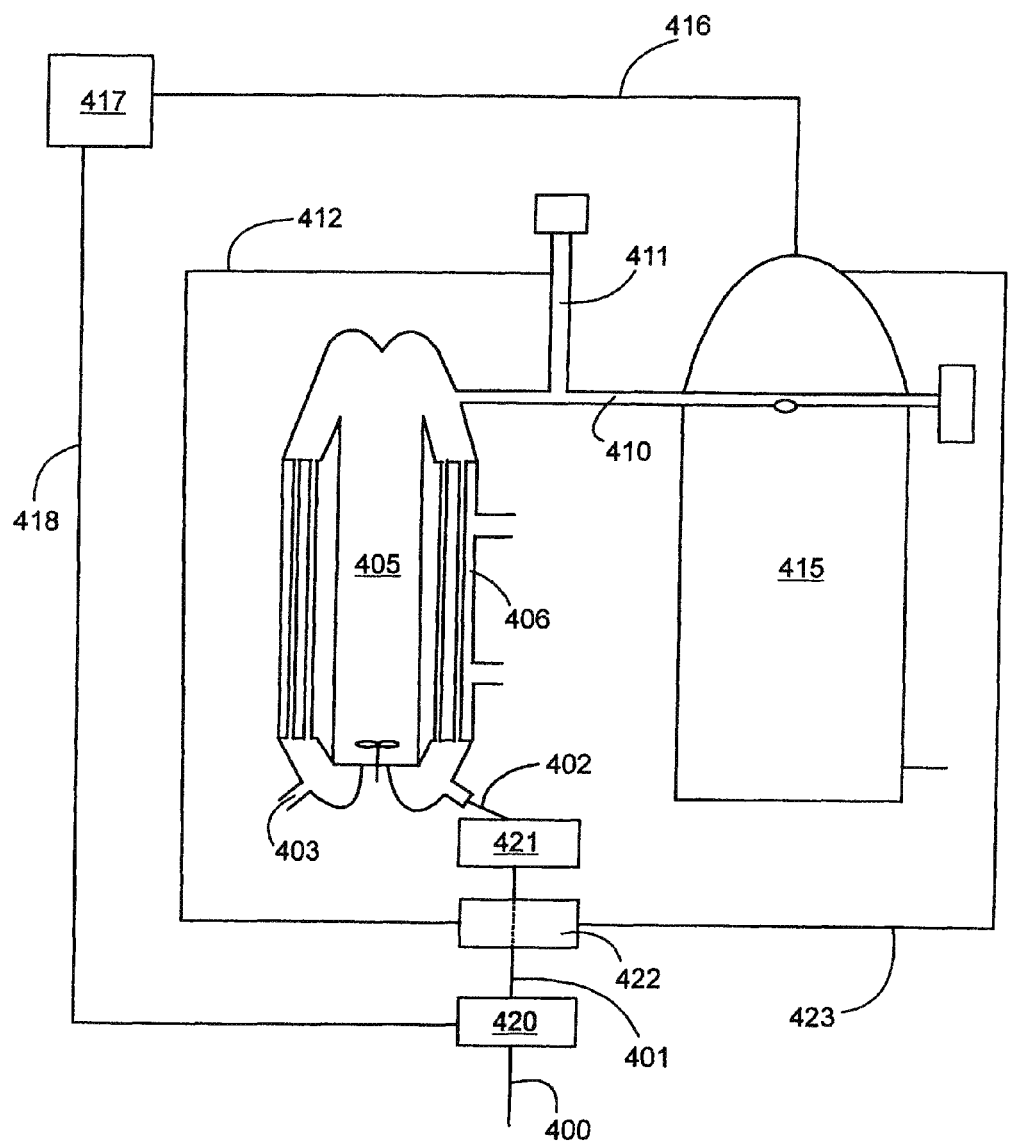

FIG. 6 depicts another embodiment of a process for producing butyl rubber in accordance with the present invention in which the energy of cold liquid reaction medium is used to cool a mixed feed of methyl chloride and monomers. Fresh feeds 400 together with recycled materials 418 go into a storage and blending system 420, which operates at close to ambient temperature. A mixed feed 401, including isobutylene and isoprene monomers in liquid methyl chloride in proportions required by the process, is transported from the storage and blending system 420 to a preliminary heat exchanger 422 and then to a final cooler 421 where the mixed feed is cooled to below about −90° C. to form a cold mixed feed stream 402. The cold mixed feed stream 402 and a cold (below about −90° C.) catalyst feed stream 403 of aluminum chloride catalyst in methyl chloride are continuously fed into a reactor 405 where polymerization occurs at a temperature normally maintained in a range from about −90° C. to about −98° C. by a cooling system 406 utilizing the evaporation of liquid ethylene. Rubber slurry produced during polymerization is transported to a self-cleaning co-rotating fully intermeshing twin screw extruder 410 where rubber phase is separated by expression from the liquid reaction medium. Residual methyl chloride and monomers are flashed from the rubber by hot water at a temperature of about 75° C. in a flash tank 415. Methyl chloride and monomer vapors are transported through line 416 and subjected to a number of processing steps 417, including drying, compressing and purifying, leaving the bulk as a purified liquid that is recycled through line 418 into the storage and blending system 420. Cold separated liquid reaction medium is transported off stream from the co-rotating fully intermeshing twin screw extruder 410 by a counter-rotating fully intermeshing twin screw extruder 411 and transported through line 412 to the preliminary heat exchanger 422 to provide substantial cooling of the mixed feed. In this way, less energy is required by a heat exchanger, using liquid ethylene, as a final cooler 421 to cool the mixed feed before it enters the reactor 405. After being used to help cool the mixed feed, the separated liquid reaction medium is transported through line 423 to the flash tank where volatile components (e.g. methyl chloride and monomers) are vaporized and recycled as described above, while non-volatile components (e.g. oligomers and low molecular weight polymer components) become part of the rubber. Other features of the process are known to one skilled in the art.

The processes of the present invention may be applied on a commercial or pilot scale; however, certain process conditions may differ between a commercial and a pilot scale process. On a commercial scale, the flow through in the reactor may be on the order of 12,000 kg/h while on a pilot scale, the flow through may be about 8 kg/h. In the mixed feed, the ratio of methyl chloride to monomers may be about 69:31 on a commercial scale, while on a pilot scale the ratio may be about 82:18. Discharge concentrations of methyl chloride, residual monomers and rubber from the reactor on a commercial scale may be in a ratio of about 69:6:25 respectively, while in a pilot scale reactor the ratio may be about 82:6:12 respectively.

Where liquid reaction medium is being separated from rubber in an expression separator (e.g. a fully intermeshing co-rotating twin screw extruder), the concentration of solids being discharged from the extruder can be about 68 wt % on both commercial and pilot scales. Therefore, on a commercial scale, the amount of liquid separated for recycling may be about 84%, while on a pilot scale, the amount of liquid being separated for recycling may be about 94%. Given that the amount of liquid separated for recycling may be about 84% on a commercial scale, the total heat removed by refrigeration in a commercial process of the present invention would be about 70% of that in a conventional commercial process. In the case of the embodiment shown in FIG. 5, further economies result from the reduced quantity of vaporized reaction medium recycled from the flash tank.

A fully intermeshing co-rotating twin screw extruder particularly useful on a pilot scale may have a 2 start design having a flight lead of about 38 mm, a screw diameter of about 24 mm, an extruder length of about 36 diameters and a rotational speed of about 100 rpm.

Having thus specifically described the present invention, it will be evident to one skilled in the art that modifications may be made which are encompassed by the scope of the invention claimed hereafter.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. An apparatus for producing an isoolefin-diolefin rubber comprising:
    (a) a reaction vessel comprising an impeller for preparing a slurry of an isoolefin-diolefin rubber in a liquid non-aqueous reaction medium at a temperature in a range of from −110° C. to −50° C., said reaction vessel having an outlet;
    (b) an expression separator in fluid communication with the outlet of the reaction vessel for separating at least part of the liquid non-aqueous reaction medium in the liquid form from the rubber;
    (c) a slurry processing vessel in fluid communication with the expression separator for receiving residual slurry; and,
    (d) a conduit in fluid communication with the expression separator at one or more points between the reaction vessel and the slurry processing vessel for transporting the liquid non-aqueous reaction medium separated in liquid form from the rubber by the expression separator out of the expression separator and away from the reaction vessel.

2. The apparatus according to claim 1, wherein the conduit further comprises a mechanical filter in fluid communication with the expression separator for further separating the at least part of the liquid reaction medium from the rubber.

3. The apparatus according to claim 2, wherein the mechanical filter is a fully intermeshing counter-rotating twin screw extruder.

4. The apparatus according to claim 1, wherein at least part of the separated liquid reaction medium is recycled into the reaction vessel.

5. The apparatus according to claim 1, wherein the conduit further comprises a heat exchanger for receiving and cooling at least part of the liquid reaction medium.

6. The apparatus according to claim 1, wherein the expression separator is a fully intermeshing co-rotating twin screw extruder.

7. The apparatus according to claim 1, wherein the slurry processing vessel is a flash tank.

8. An apparatus for producing an isoolefin-diolefin rubber comprising:
    (a) a reaction vessel comprising an impeller for preparing a slurry of an isoolefin-diolefin rubber in a liquid non-aqueous reaction medium at a temperature in a range of from −110° C. to −50° C. said reaction vessel having an outlet;
    (b) a self-cleaning fully intermeshing twin screw conveyor in fluid communication with the outlet of the reaction vessel for transferring the rubber from the reaction vessel to a slurry processing vessel; and
    (c) a conduit in fluid communication with the twin screw conveyor at one or more points between the reaction vessel and the slurry processing vessel for transporting the liquid non-aqueous reaction medium separated from the slurry away from the reaction vessel.

9. The apparatus according to claim 8, wherein the conveyor is a self-cleaning fully intermeshing co-rotating twin screw extruder.

10. The apparatus according to claim 8, wherein the slurry processing vessel is a flash tank.

* * * * *